June 20, 1950  C. R. SACCHINI  2,511,946
WIPING MECHANISM

Filed March 25, 1944  4 Sheets-Sheet 1

INVENTOR
COLUMBUS R. SACCHINI
By George M. Soule
ATTORNEY

INVENTOR
COLUMBUS R SACCHINI
By George M Soule
ATTORNEY

June 20, 1950　　　　C. R. SACCHINI　　　　2,511,946
WIPING MECHANISM

Filed March 25, 1944　　　　　　　　　　　　　　4 Sheets-Sheet 3

INVENTOR
COLUMBUS R. SACCHINI
BY George M. Soule
ATTORNEY

INVENTOR
COLUMBUS R. SACCHINI
By George M. Soule
ATTORNEY

Patented June 20, 1950

2,511,946

UNITED STATES PATENT OFFICE 2,511,946

WIPING MECHANISM

Columbus R. Sacchini, Willoughby, Ohio, assignor to The Marquette Metal Products Company, Cleveland, Ohio, a corporation of Ohio Application March 25, 1944, Serial No. 528,053

8 Claims. (Cl. 15—253)

This invention relates to a mechanism for imparting lateral motion to a member or plurality of members such as window or windshield wiper blades and synchronizing the motions of said blades if more than one is used or synchronizing the motion of different parts of a single blade when driven as at opposite ends.

In typical airplane window and windshield installations such as illustrated herewith and wherein it is desired to use a single prime mover for imparting motion to more than one wiper arm, an important problem is presented by having to locate the driving motor or prime mover in such position that it will not conflict with other essential instruments or impair vision on part of the pilot and other personnel. The advantages of using a single prime mover for a plurality of wiper drive arm actuating or "window units" is, of course, obvious and heretofore generally in airplane installations where such single installation is used the usual method has been to effect transmission of power to the window units largely by push and pull flexible shafting. Such push and pull flexible shafting was favored primarily because its action was considered positive over fairly long distances of operation and the vibration incident to rapid reciprocating motion was accepted as practically unavoidable. The use of flexible torsional shafting was avoided particularly where the driving means had to be placed a considerable distance from the ultimate driven means because unless such torsional shafting were made excessively heavy the same is subject to at least some appreciable twist from end to end. I have found that practically regardless of distance and regardless of using light weight flexible shaft units of unequal length, hence unequal tendency to twist, wiper drive arms disposed a great distance apart and driven through flexible shafting can be adjusted for perfect synchronization to the desired degree. Two exemplary arrangements showing such compensating adjustment for effecting synchronization are shown herewith and will be described below.

Special wiping equipment for very large and particularly long areas represented by bombardier's windows on large bombing planes require wiping members which, because of their length, are best supported as at opposite ends. My prior application Serial No. 495,836, filed July 23, 1943, now Patent No. 2,376,013, May 15, 1945, shows one arrangement whereby a relatively long wiper blade is supported at opposite end portions and driven laterally of itself across the area to be wiped. In that particular arrangement only one end of the blade was positively driven and the other end caused to follow the driven end through the intermediary of a parallelograph linkage. Proposals have been made for driving and supporting such relatively long blades at both ends and the present specific arrangement for operating such wiper blade for a bombardier's glass or window is of the latter type.

One problem presented by both types of bombardier glass wiping arrangements such as outlined above is so to support the blade that it can be easily lifted off the surface to be wiped in order fully to clean the glass prior to flight as by a squeegee or cloth. Another problem is in respect to maintaining the blade against bowing and tilting particularly where the blade is very long. Still another problem is presented by the increasing size and varying shapes of transparent areas to be wiped by a single wiping element and particularly where it is desirable to wipe the surface of large transparent panels from side frame to side frame. In driving a long blade at both ends further problems are presented by having to synchronize the motions of the two necessary drive arms for the wiper.

The arrangements illustrated herewith overcome or satisfactorily solve all of the problems indicated above and others, and the general object is to provide a wiper mechanism which will solve those problems.

Other objects and features of the invention will become apparent from the following description with reference to the drawings in which.

Figure 1:
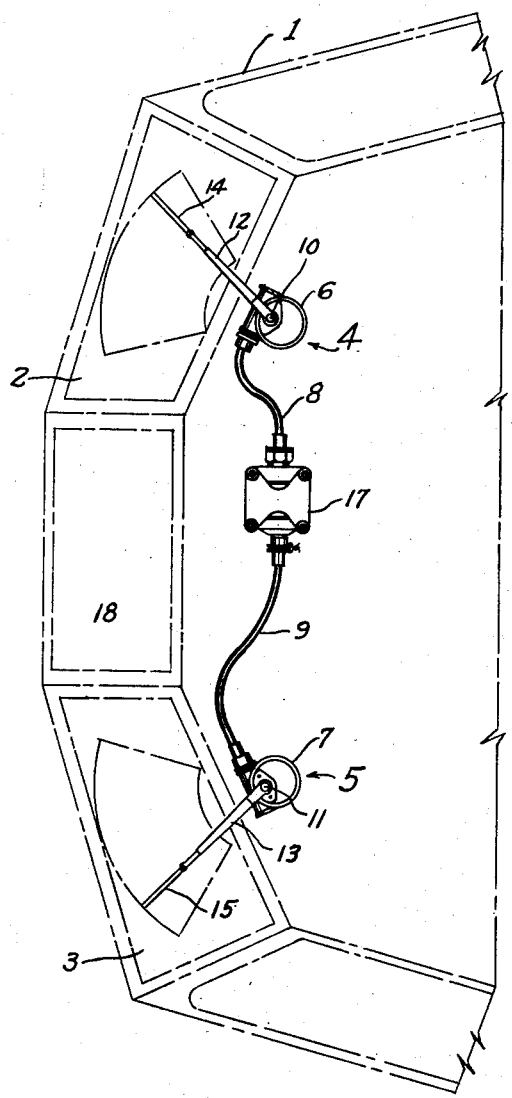
Fig. 1 is a more or less diagrammatic assembly view showing two window wiper units associated with individual areas to be cleaned and an interconnecting drive for said units.

Referring to Fig. 1 the forward end of an airplane fuselage or body is indicated diagrammatically at 1 having two laterally disposed transparent windshield panels 2 and 3 respectively which are to be wiped by the window unit and wiper drive arm mechanisms, generally indicated at 4 and 5. The wiper drive arm mechanisms are essentially alike and comprise motion converters 6 and 7 by which unidirectional motion of (e. g.) flexible shafts in flexible casings 8 and 9 is converted to alternate rotary motion or oscillation at power take-off shafts 10 and 11 of said converter mechanisms. The shafts 10 and 11 carry drivingly rigid therewith drive arm assemblies 12 and 13 which, in turn, support wiper blades 14 and 15 for traverse of the desired areas of the transparent panels 2 and 3.

A single driving motor, for instance a high speed, low voltage, direct current electric motor 17, has opposite ends of its rotor or armature shaft, not shown, drivingly connected to the flexible shafts inside the casings 8 and 9 so that when the motor is energized both shafts are driven unidirectionally at the same speed. Details of suitable motor and converter installations will be hereinafter described in connection with the typical arrangement shown by Figs. 2 and 3 and accompanying detail drawings. For the present, however, the mechanisms 6 and 7 may be considered as worm gear reduction units including Scotch yoke mechanisms driven by the worm gears so that the shafts 10 and 11 are oscillated through the desired angles. These angles are adjustable by already known means so that each of the blades 14 and 15 may be caused to traverse areas of different size or the same sized areas, as desired.

As noted on Fig. 1 the motor or prime mover is set closer to the converter mechanism 6 than it is to the converter mechanism 7 in order, for example, to move the motor completely out of the line of vision through the central transparent panel 18 of the ship or for example to clear any essential instrument that may preclude or render difficult installation centrally of the two converter units. With such one-sided disposition of the motor, one of the flexible drive shafts would ordinarily be longer than the other and the longer one would inherently have the greater amount of twist if the applied torque is equal. Unequal degrees of twist in different flexible shaft units connected to a common power source can arise also from other causes, for instance closer working clearances in driven mechanisms (e. g. window units) and greater pressure of one wiper or wiper portion on the glass than that of a companion wiper or wiper portion. If upon installing the mechanism according to Fig. 1, because of such unequal twisting, one of the wipers has the effect of lagging behind the other, either one of the flexible drive shafts may be disconnected either from the motor or from the associated converter unit, and the converter unit so disconnected from the source of power can then be turned as through its worm shaft to dispose the wiper drive arm in such a position that, when reconnected, the twist will be compensated for by the change in driving relationship between the reconnected parts.

Figure 3:
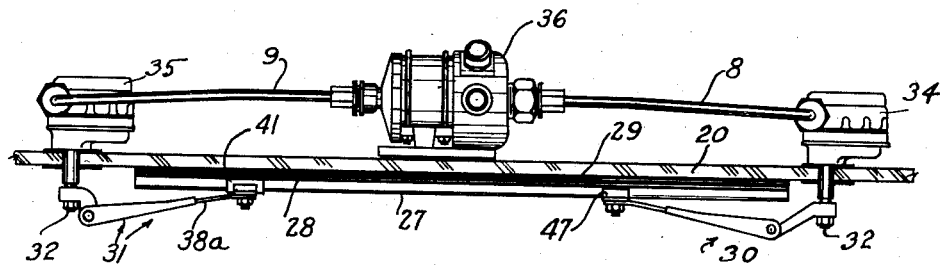
Fig. 3 is a sectional side elevation of the arrangement according to Fig. 2.

The preferred manner of disassociating the driving elements to effect such synchronization or twist compensation will be more fully explained in connection with Figs. 2 and 3 where essentially the same problem is presented but in respect to synchronization of the two ends of a single elongated wiper blade.

Figure 2:
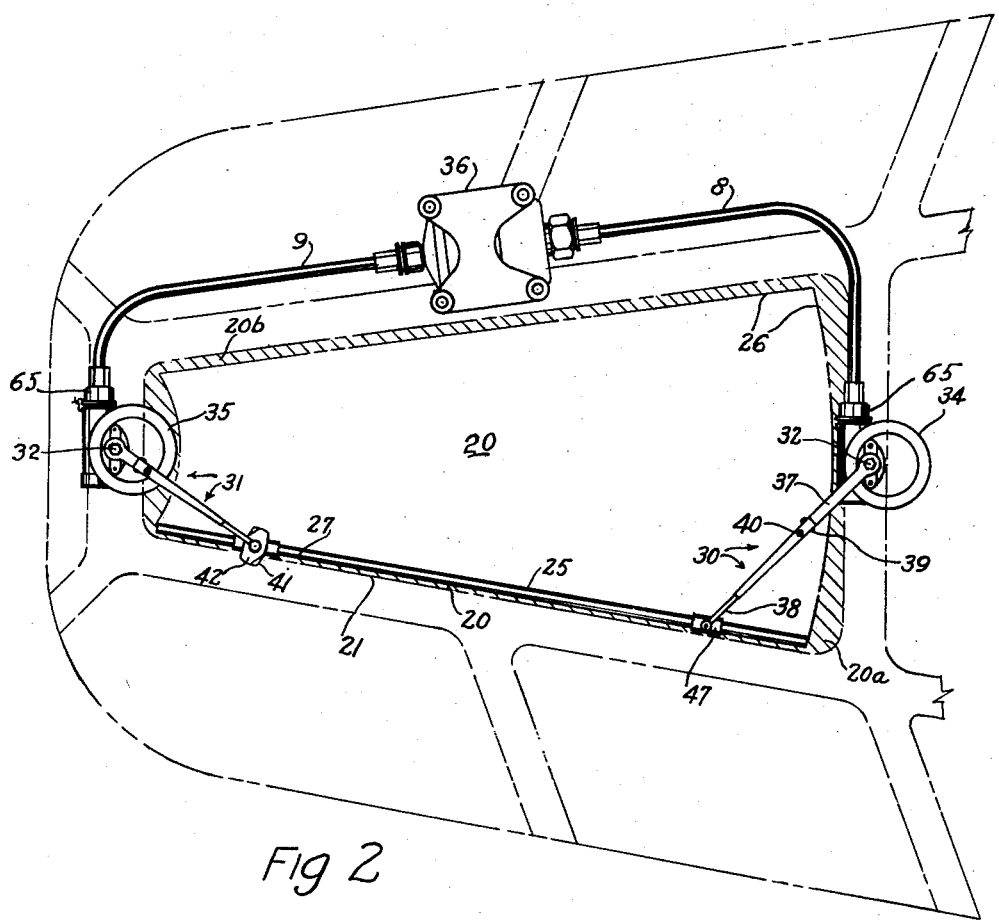
Fig. 2 is an installation of a different type in which a single long wiper blade is caused to traverse a generally trapezoidal surface as of a bombardier's glass.

Referring to Fig. 2 the framework supporting a generally trapezoidal bombardier's glass or window 20 is indicated mainly by broken lines at 21. The glass, as shown, has its wider end 20a disposed rearwardly of the fuselage in the usual manner and the narrower end 20b forwardly. The wiper blade 25 extends nearly from end to end of the glass so that by reciprocating the two ends simultaneously at slightly different speeds a generally converging area, such as indicated at 26, is cleared by the strokes of the wiper blade. The wiper blade may be of any suitable construction comprising for example a tubular or channel-shaped backing piece 27 which embraces between separated flanges a resilient squeegee member 28 of any suitable shape having a thin edge 29 for contact with the glass.

The drive arm assemblies 30 and 31 are supported for oscillating movement by identical drive shafts 32 (see Fig. 4) of the motion converter units 34 and 35 corresponding to the units 6 and 7 of Fig. 1 and similarly driven by a common prime mover 36 to be described in detail later. The shafts 32 oscillate through different angles because the drive arm assembly 30 has to traverse a greater angle about the axis of its drive shaft than does the assembly 31. Adjustment mechanism in the converters, which may be substantially according to my prior application Serial No. 463,747, filed October 29, 1942, now Patent No. 2,393,193 granted January 15, 1946, enables the difference in angular movement of the drive arm assemblies.

Each of the drive arm assemblies (see Fig. 4) comprises a head section 37 secured rigidly to its drive shaft 32, as by complementary spline serrations at 32a and an arm extension 38 pivoted to the head section as at 39, so that the extension 38 can move perpendicular to the plane of the glass. A pressure adjustment shown in the form of a screw 40 enables the pressure of the squeegee on the glass to be made uniform at all portions of the wiped area. The extension 38 of the drive arm assembly 31 has a spring arm end portion 38a pivotally connected to the blade backing member 27. The backing member carries rigid therewith, for example welded on, a pad or bracket 41 extending at both sides of the median plane of the wiper blade and the extension 38 has a flat plate 42 rigid therewith and maintained in face to face contact with the pad or bracket over substantial areas laterally of said median plane as by a pivot pin or stud 43 projecting from the bracket 41 loosely through an opening 44 in the plate 42 and adjacent drive arm extension. The holes through the plate 42 and extension 38 are sufficiently larger than the diameter of the stud so that the blade can be moved directly away from the glass against the tension of a suitable take-up spring in the drive arm assembly. A somewhat similar pivotal connection between the drive arm assembly 30 and a sliding saddle member 47 on the blade (described below) enables the opposite end of the blade similarly to be moved away from the glass.

Figure 4:
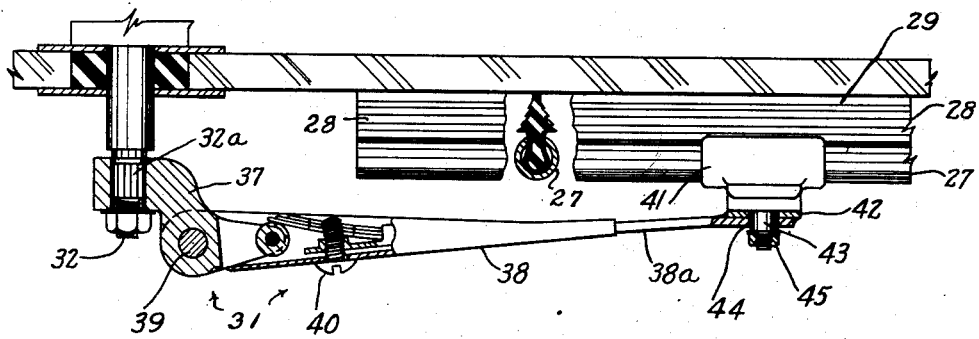
Fig. 4 is a relatively enlarged fragmentary sectional view showing a wiper drive arm, supporting and driving means therefor, and connecting means thereof with a typical wiper blade such as shown in Fig. 2.

As shown in Fig. 4 the plate 42 is maintained in proper working contact with the bracket 41 by a self-locking nut 45 on the outer end of the stud 43. The pivotal connection just described determines the path of movement of the end of the blade adjacent the converter unit 35. The two converter units are preferably centrally disposed with reference to the side limits of the glass or at least their drive arms 32 are so disposed.

The connection between the drive arm assembly 30 and the adjacent end of the wiper blade comprises the sliding saddle 47 which is so fitted to the tubular backing as to enable the saddle to slide along the backing while being prevented from turning on said backing about the longitudinal axis of the latter. The extension 38 of the assembly 30 is secured to the saddle in much the same manner as the extension of the assembly 31 is secured to the pad or bracket 41 except that no provision is made to cause any part of the drive arm assembly 30 to resist turning of the blade assembly about the longitudinal axis of the backing.

Figure 8:
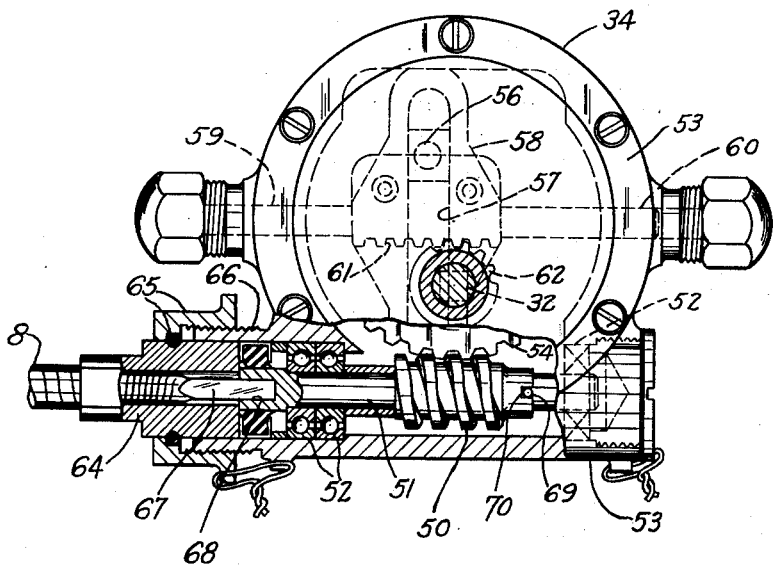
Fig. 8 is a sectional and elevational view showing a motion converter arrangement suitable particularly for application to the problem presented by an installation according to Figs. 2 and 3.
Figure 9:
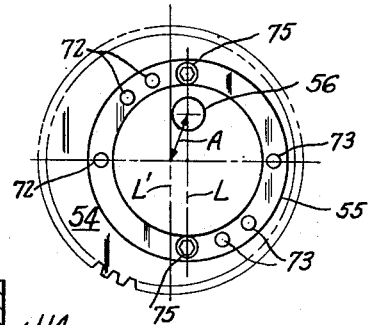
Fig. 9 is a detail view of the converter mechanism showing, particularly, a means for adjusting the degree of swinging movement of a wiper drive arm actuated by the converter.

The converter unit, shown by Figs. 8 and 9, and which may be considered to be the unit 34 of Fig. 2, includes a worm 50 on a worm shaft 51 supported in antifriction bearing assemblies 52 contained in the lower part of a housing 53. The worm is shown in mesh with a worm wheel 54 supported in suitable bearings, not shown, in said housing. The worm wheel carries thereon, as best shown by Fig. 9, an adjustable crank plate 55 having a crank pin 56 projecting laterally from one face of the worm gear. The crank pin 56, as brought out by dotted lines in Fig. 8, operates in a vertical slot 57 of a Scotch yoke crosshead 58 having suitable guides including oppositely disposed and aligned pins 59 and 60 slidable in bores of said housing. The Scotch yoke crosshead has rigid therewith a rack 61 in mesh with teeth of a spur pinion 62 which pinion is drivingly rigid with the power take-off shaft 32 of the converter unit.

The small portion of the flexible shaft unit which is associated with the converter mechanism just described comprises a portion of flexible casing 8 suitably fastened (e. g. welded) to an adapter head 64 secured as by a threaded ring and abutment assembly 65 to a threaded extension 66 of the housing 53 in line with the worm shaft. A squared end 67 of the flexible shaft enters a complementary opening 68 in the adjacent end of the worm shaft 51 in order to drive said shaft unidirectionally as the electric motor is operated. In the particular worm and gear assembly shown in Fig. 8 the worm 50 is rigidly keyed to its worm shaft 51 by a cross pin 69 driven in the shaft and entering opposite portions of an open cross slot 70 in an adjacent end of the worm. With any assumed position of the crank pin 56 the throw of the drive arm assembly 30 will always be through the same angle. The drive plate arrangement 55 (Fig. 9), which may be exactly the same as that of my application Serial No. 463,747, mentioned above, enables the angle of movement of the drive arm to be adjusted as would be necessary in the case of a trapezoidal window such as shown by Fig. 2 so that the drive arm assembly 31 will move through a less angle of oscillation than the drive arm assembly 30.

The drive plate 55 which carries the crank pin 56 may, for purposes of adjustment such as just mentioned, be mounted on or connected to the worm wheel 54 at a series of diametrally disposed paired openings some of which are shown in full lines at 72 and 73. One pair of these openings is occupied by respective attaching screws 75 which pass through the associated openings 72 and 73 into a single pair of threaded openings on the worm wheel. The openings on the drive plate are along a center line L which is slightly offset with respect to the center line L' of the worm wheel so that in the particular position of the drive plate shown the crank pin 56 has an effective distance from the center, indicated by the double arrow A. When the attachment screws 75 occupy the other selected holes 72 and 73 the distance of the crank pin from the worm wheel center is changed as more fully described in my copending application. Any greater number and/or closer spacing of paired openings 72 and 73 may be provided depending upon the differences in throw desired on part of the drive arm assemblies 30 and 31.

The construction of the converter unit 35 is essentially the same as that just described, hence no further explanation is needed. The same is true of the converter units 6 and 7 of Fig. 1.

Figures 5, 6:
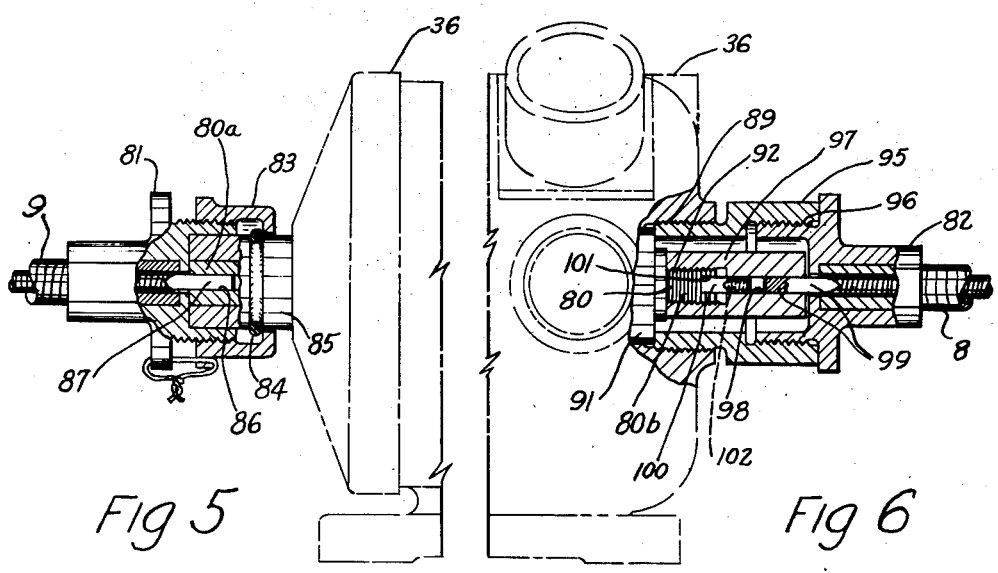
Fig. 5 is a relatively enlarged central sectional view of one end of a motor shaft and bearing assembly such as shown on Fig. 3 (left end), said view also showing a preferred means for connecting said end of the motor shaft to a flexible torque shaft.
Fig. 6 is a view similar to Fig. 5 showing the opposite end of the motor shaft, bearing assembly and flexible shaft connections (right end of motor as shown in Fig. 3)

The connections of the proximate ends of the flexible shafting to the rotary shaft 80 of the motor 36 (or 17, Fig. 1) are shown in Figs. 5 and 6. Said proximate ends of said flexible shaft assemblies carry rigid with the casings 9 and 8 threaded adapter heads 81 and 82. In the construction shown by Fig. 5 the adapter head 81 is screwed into an internally threaded sleeve 83 having a split ring abutment connection at 84 with an extension portion 85 of the motor housing. The end 80a of the rotor shaft has a non-circular socket 86 receiving the non-circular end 87 of the flexible shaft when the threaded adapter 81 is screwed tightly into the threaded sleeve 83.

Figure 7:
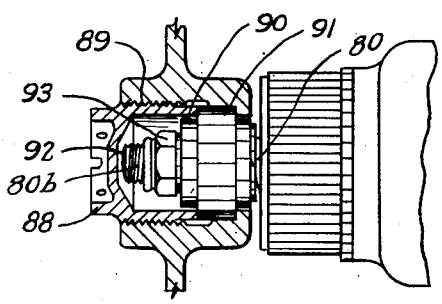
Fig. 7 is a view corresponding generally to Fig. 6 but showing parts of the motor shaft support prior to installation of the driving connections of Fig. 6.

The end of the flexible shaft assembly which carries the adapter 82 has a special arrangement in order to adapt it to motors which ordinarily have drive shafts projected from but one end. Such construction of the non-projecting end of the shaft (80b) is shown by Fig. 7 wherein a hollow cap nut 88 is shown as threaded at 89 into an enlarged hollow portion of the motor housing. Said cap nut has a flange at 90 abutting an outer race member of the adjacent motor bearing assembly 91 to hold the latter tightly in place. The end 80b of the motor drive shaft has screw threads at 92 which normally carry a nut 93 for abutting an inner race portion of the bearing assembly 91. The relative abutment relationship effected between the outer race of the bearing assembly and the shoulders provided by the motor housing and cap nut 88 and the abutment between the nut 93 and the inner bearing race prevents any end movement of the rotor shaft from taking place.

In securing the flexible shaft assembly 8 to the motor I make use of the threads at 89, see Fig. 6, in securing an adapter sleeve 95 in place in the housing, which adapter sleeve abuts the bearing assembly 91 and holds it in place and forms a threaded support as at 96 for the adapter head 92 of the flexible shaft assembly. In place of the nut 93 I secure to the threads 92 an elongated coupling member 97 having threads complementary to those of the shaft and, therebeyond, a broached opening 98 extending therethrough and of the same cross sectional shape as the end 99 of the flexible drive shaft (e. g. square). Said broached opening also receives a key member 100 which is preferably lightly pressed into the non-circular opening 98, and the threaded end 92 of the rotor shaft is cross slotted as at 101 to receive the inner end of the key member 100, thus to prevent the coupling member 97 from becoming unscrewed from the rotor shaft. In assembly the coupling member 97 is screwed sufficiently tightly against the inner bearing race member of the bearing assembly 91 to take up the necessary amount of play and then the key member 100 is pressed into place until the inner end thereof is seated in the cross slot 101. For disassembly, in servicing the motor, the key member 100 may be provided with pull-out threads shown in dotted lines at 102.

Referring specifically to the bombardier's glass type of wiper mechanism shown by Fig. 2, it will be seen that if the motor 36 has to be so placed with reference to the two converter units 34 and 35 that one flexible drive shaft assembly is longer than the other and hence inherently subject to more twist and the amount of twist cannot easily be predetermined, it is a simple matter to uncouple the flexible drive shaft end of the longer shaft from its associated converter as by removing the sleeve 65, Fig. 8, of that converter and then turning the worm 50 as by a suitable non-circular tool inserted into the end opening 68 of the worm shaft until the drive arm assembly 30 or 31 is in proper synchronized relation to the other drive arm assembly 31 or 30. Then upon reconnecting the flexible shaft end to the worm shaft and repositioning the clamping nut 65, the two drive arm assemblies will be synchronized and remain so. The reason that synchronization can be so effected notwithstanding that the drive arm moves back and forth (wherefore it would seem that synchronization for movement of the drive arm assembly in one direction would not effect synchronization for movement in the opposite direction) is that each rotary adjustment of the worm brings the Scotch yoke crosshead to a different position than it formerly occupied which position will be attained again after a certain number of turns of the worm by the motor and regardless of the actual direction of rotation of the motor. Actual test experience has proven that once synchronization of the two drive arm assemblies has been obtained the drive arm assemblies thereafter remain in synchronism. The twist in the longer flexible shaft is always in the same rotational direction so long as the motor continues to turn in that same direction. If the motor is reversed for any reason then double the degree of twist occurs before further driving of the converter begins to move the cross head from its instantaneous position at the time the reversal is effected, but that does not change the relative position or synchronous operation of the two drive arm assemblies.

Figure 10:
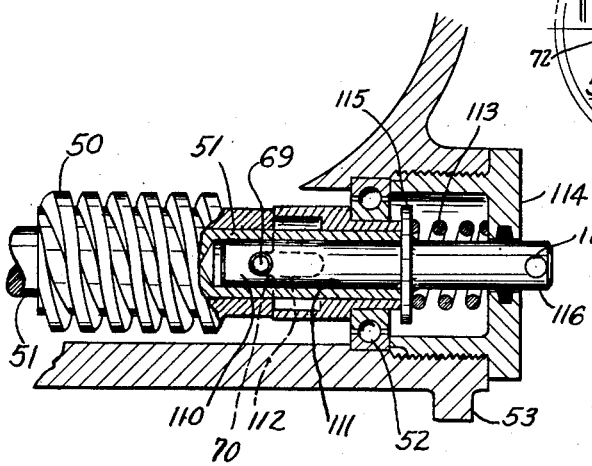
Fig. 10 is a sectional view showing a modified means of adjustment for compensating e. g. for differences in twist in flexible shafting.

While the preferred practice in effecting synchronizing adjustment is to disconnect the remote ends of one flexible shaft section from its associated converter unit, synchronization could also be effected by changing the relatively turned positions of any two connected members of the drive so long as those members are members which normally rotate unidirectionally. For example, as shown in Fig. 10, the cross key 69 which connects the shaft 51 to the worm 50 may be releasable from the worm as by a sliding plunger 110 movably mounted in an end bore 111 of the drive shaft 51. The cross pin 69 is secured tightly in the plunger 110 so as to extend through diametrically opposed axial slots 112 in the wall of the shaft 51 adjacent said bore 111 and thence into respective portions of the end slot 70 of the worm. The plunger 110, as shown, is normally maintained in position to retain the key connection between the shaft and worm as by a spring 113 seated at one end against a shoulder 115 on the plunger. A releasing or operating stem 116 of the plunger may extend outwardly beyond the cap 114 so that it is unnecessary to effect any disassembly in order to make the synchronizing adjustment between such normally unidirectionally rotated parts of the drive.

It should be noted that a turning operation of the plunger 110, as by a capstan pin inserted in cross opening 117, after release of the cross pin 69 from driving connection with the worm 50 will actually reset the drive arm assembly which is disassociated from the converter unit on which the cross pin releasing plunger is mounted. Thus, for synchronization by the use of the plunger 110, the drive arm of a different converter mechanism is adjusted rather than the associated converter as in the case of compensating for unequal twisting of flexible shafting by direct operation of the worm 50 through its worm shaft when the flexible drive shafting is disconnected as previously described.

While in the arrangements shown and described both of the two flexible drive shafts of each installation rotate in the same direction because of being connected to a single rotor element of the motor, the expression "unidirectionally rotated" as applied for instance to such flexible shaft assemblies is not intended to indicate that both shafts, where two are used, are turned in the same direction at any time but, instead, that each shaft normally turns unidirectionally as distinguished from being turned alternately back and forth.

I claim:

1. In window or windshield wiping mechanisms, in combination, a prime mover having take-off elements, each arranged to be turned unidirectionally by the prime mover, torsional drive shaft units connected respectively to said elements, motion converter mechanisms operatively connected to said units respectively and having means to cause the unidirectional motion of the torsional shafts to drive respective driven elements of said converter mechanisms with alternate rotary motion, and a single wiper blade having opposite end portions thereof drivingly connected to respective driven elements.

2. A window or windshield wiping mechanism comprising a prime mover having a rotary drive shaft and flexible torsional shafts connected respectively to opposite ends of said drive shaft, motion converter units connected respectively to the remote ends of said torsional shafts and operating to impart alternate rotary motion to respective take-off elements of said converter units, a single wiper blade with opposite end portions thereof connected to the take-off elements.

3. A window or windshield wiping mechanism comprising a prime mover having a rotor arranged to turn unidirectionally during operation of the prime mover, flexible drive shafts connected to opposite ends of the rotor, one drive shaft being of sufficient length as to enable appreciable twisting thereof by the rotor relative to the twist in the other flexible shaft, speed reducing motion converter mechanisms operatively connected to the remote ends of respective shafts, one of the connections aforesaid being readily demountable so that the operative relationship between the rotor and one converter mechanism can be readily adjusted to compensate for such twist, said motion converter mechanisms having power take-off elements driven by the converter mechanisms with alternate rotary motion, wiper drive arms operatively secured to said take-off elements respectively, and wiper means operatively connected to the drive means.

4. A window or windshield wiping mechanism comprising an elongated wiper blade adapted to be moved to and fro over a surface to be wiped, oscillating mechanisms operatively disposed at opposite end portions of the wiper blade and connected to respective end portions and a common means for operating both said oscillating mechanisms in synchronism, said common means including unidirectionally rotated shafting.

5. A window or windshield wiping mechanism comprising an elongated wiper member, drive-arm-actuating mechanisms disposed generally at opposite ends of the wiper member and operable to swing respective drive arms thereof in a manner to move opposite ends of the wiper member simultaneously back and forth across the area to be wiped or cleared, torsional flexible drive shafting drivingly connected to said drive arm actuating mechanisms, and a single power mechanism drivingly connected to the flexible shafting.

6. A window or windshield wiping mechanism comprising an elongated wiper blade adapted to be moved to and fro over a surface to be wiped, speed reducing motion converter mechanisms operatively disposed at opposite end portions of the wiper blade and having take-off elements connected to respective end portions of the blade, and a common means for operating both said speed reducing converter mechanisms, said common means including unidirectionally rotated shafting part of which is separable from and reconnectable to an associated driving or driven part for maintaining synchronous operation of the take-off elements.

7. A window or windshield driving mechanism comprising an elongated wiper element adapted to be moved to and fro over a surface to be wiped, oscillating drive arm actuating mechanisms operatively disposed at opposite ends of the wiper element and having input driving elements adapted to rotate unidirectionally, a common means for operating both said oscillating mechanisms in synchronism, said common means including unidirectionally rotated shafting connected to both input elements, one part of said shafting being capable of angular adjustment with respect to the associated input driving element in a manner to compensate for non-synchronous operation of the drive arm actuating mechanisms.

8. A window or windshield wiping mechanism of the class described and wherein the surface to be wiped or cleared is of generally trapezoidal form presenting different surface widths at opposite portions, an elongated wiper element and drive arms connected to opposite ends thereof, a pair of motion converters with oscillating output shafts connected to respective drive arms and centrally disposed with reference to said opposite portions of said surface, said motion converters including unidirectionally rotating input means to drive said shafts and one converter including means to adjust the amplitude of oscillating motion of its output shaft so that one output shaft can move the associated wiper arm through a greater angular distance than the other moves its arm, and driving mechanism for turning the unidirectionally rotating means of said converter mechanisms.

COLUMBUS R. SACCHINI.

REFERENCES CITED

The following references are of record in the file of this patent:

UNITED STATES PATENTS

| Number | Name | Date |
| --- | --- | --- |
| 1,509,699 | Atchison | Sept. 23, 1924 |
| 2,100,188 | Hansmann | Nov. 23, 1937 |
| 2,326,349 | Fuller | Aug. 10, 1943 |
| 2,329,895 | Hansen | Sept. 21, 1943 |
| 2,333,854 | Fuller | Nov. 9, 1943 |